United States Patent
Tang et al.

(10) Patent No.: US 11,168,612 B2
(45) Date of Patent: Nov. 9, 2021

(54) SIGNAL PROCESSING FOR VARIABLE GEOMETRY MECHANISM CONTROL

(71) Applicant: PRATT & WHITNEY CANADA CORP., Longueuil (CA)

(72) Inventors: Poi Loon Tang, Montreal (CA); Kaveh Moezzi Madani, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 235 days.

(21) Appl. No.: 16/137,800

(22) Filed: Sep. 21, 2018

(65) Prior Publication Data
US 2020/0095933 A1 Mar. 26, 2020

(51) Int. Cl.
*F02C 7/057* (2006.01)
*F02C 3/13* (2006.01)
(Continued)

(52) U.S. Cl.
CPC ............... *F02C 7/057* (2013.01); *F02C 3/13* (2013.01); *F02C 7/042* (2013.01); *F04D 19/02* (2013.01);
(Continued)

(58) Field of Classification Search
CPC .. F02C 7/057; F02C 7/042; F02C 3/13; F02C 6/08; F02C 6/206; F04D 19/02;
(Continued)

(56) References Cited

U.S. PATENT DOCUMENTS

| | | | |
|---|---|---|---|
| 3,973,391 | A | 8/1976 | Reed et al. |
| 4,438,406 | A | 3/1984 | McCormick et al. |

(Continued)

FOREIGN PATENT DOCUMENTS

| | | |
|---|---|---|
| EP | 3584429 | 12/2019 |
| FR | 2988774 | 10/2013 |

(Continued)

OTHER PUBLICATIONS

U.S. Appl. No. 16/110,699, filed Aug. 23, 2018. Title: Variable Geometrics Transient Control Logic.

*Primary Examiner* — Thomas E Worden
(74) *Attorney, Agent, or Firm* — Norton Rose Fulbright Canada LLP

(57) ABSTRACT

Herein provided is a signal processing device for use in an aircraft engine with a variable geometry mechanism (VGM) and associated systems and methods. The signal processing device comprises a processing unit and a non-transitory computer-readable memory communicatively coupled to the processing unit. The memory has stored thereon computer-readable program instructions executable by the processing unit for: obtaining a VGM position request signal; determining whether a variation of the VGM position request signal is within a predetermined range; when the variation of the VGM position request signal is within the predetermined range: filtering the VGM position request signal to reduce a level of noise in the VGM position request signal; and transmitting the filtered VGM position request signal; and when the variation of the VGM position request signal is not within the predetermined range, transmitting a processed signal, based on the VGM position request signal.

17 Claims, 5 Drawing Sheets

(51) Int. Cl.
*F02C 7/042* (2006.01)
*F04D 19/02* (2006.01)
*F04D 27/00* (2006.01)
*F02C 6/08* (2006.01)
*F02C 6/20* (2006.01)

(52) U.S. Cl.
CPC .............. *F04D 27/002* (2013.01); *F02C 6/08* (2013.01); *F02C 6/206* (2013.01); *F05D 2220/323* (2013.01); *F05D 2240/12* (2013.01); *F05D 2250/90* (2013.01); *F05D 2270/053* (2013.01); *F05D 2270/20* (2013.01); *F05D 2270/3061* (2013.01); *F05D 2270/335* (2013.01); *F05D 2270/44* (2013.01)

(58) Field of Classification Search
CPC .............. F04D 27/002; F05D 2220/323; F05D 2240/12; F05D 2250/90; F05D 2270/053; F05D 2270/20; F05D 2270/3061; F05D 2270/335; F05D 2270/44
See application file for complete search history.

(56) References Cited

U.S. PATENT DOCUMENTS

| | | | |
|---|---|---|---|
| 4,639,885 A | 1/1987 | Spock et al. | |
| 4,866,980 A | 9/1989 | Falkmann et al. | |
| 5,313,778 A | 5/1994 | Sweet et al. | |
| 5,754,662 A | 5/1998 | Jolly et al. | |
| 6,231,306 B1 | 5/2001 | Khalid | |
| 7,130,772 B2 | 10/2006 | Burnet et al. | |
| 7,197,147 B2 * | 3/2007 | Millott | G10K 11/178 381/71.8 |
| 7,825,721 B2 | 11/2010 | Vanderleest et al. | |
| 8,090,456 B2 | 1/2012 | Karpman et al. | |
| 8,302,405 B2 | 11/2012 | Price et al. | |
| 8,626,359 B2 | 1/2014 | Andrews | |
| 8,649,954 B2 | 2/2014 | Boyer et al. | |
| 8,762,025 B2 | 6/2014 | Aurousseau | |
| 8,770,912 B2 | 7/2014 | Minto et al. | |
| 8,909,454 B2 | 12/2014 | Minto | |
| 9,322,341 B2 | 4/2016 | Belleville et al. | |
| 9,540,944 B2 | 1/2017 | Meisner et al. | |
| 10,392,099 B2 | 8/2019 | Pedrami et al. | |
| 10,400,680 B2 | 9/2019 | Asari et al. | |
| 10,443,509 B2 | 10/2019 | Kay et al. | |
| 2010/0281875 A1 * | 11/2010 | Price | F01D 17/162 60/772 |
| 2011/0016876 A1 | 1/2011 | Cataldi et al. | |
| 2014/0278014 A1 | 9/2014 | Belleville et al. | |
| 2018/0364271 A1 | 12/2018 | Djelassi | |
| 2019/0277200 A1 | 9/2019 | Mistry | |

FOREIGN PATENT DOCUMENTS

| | | |
|---|---|---|
| FR | 3070056 | 2/2019 |
| JP | 56047627 | 4/1981 |
| WO | 2019243371 | 12/2019 |

\* cited by examiner

US 11,168,612 B2

SIGNAL PROCESSING FOR VARIABLE GEOMETRY MECHANISM CONTROL

TECHNICAL FIELD

The present disclosure relates generally to gas turbine engines, and more particularly to control of variable geometry mechanisms (VGMs) in gas turbine engines.

BACKGROUND OF THE ART

During aircraft operations consisting of rapid engine transitions from low to high power levels, it is desirable to reduce the response time of the engine in order to achieve a required power. For this purpose, inlet mass flow can be increased by accelerating the gas generator of the engine, thereby increasing the engine's power. This may be achieved by a variety of techniques which adjust the shape or geometry of one or more components of the engine, called variable geometry mechanisms, thereby adjusting the response of the engine.

Various control approaches for variable geometry mechanisms are known, for example based on the speed or the torque of the engine. However, reliance on these values can lead to excessive wear on the mechanical components of the variable geometry mechanisms. There is therefore a need for improved control schemes for variable geometry mechanisms.

SUMMARY

In accordance with a broad aspect, there is provided a signal processing device for use in an aircraft engine with a variable geometry mechanism (VGM), the device comprising: a processing unit; and; a non-transitory computer-readable memory communicatively coupled to the processing unit and having stored thereon computer-readable program instructions executable by the processing unit for: obtaining a VGM position request signal via an input interface, the VGM position request signal indicative of a requested position change for the VGM; determining whether a variation of the VGM position request signal is within a predetermined range; when the variation of the VGM position request signal is within the predetermined range: filtering the VGM position request signal to reduce a level of noise in the VGM position request signal; and transmitting the filtered VGM position request signal to a controller for the VGM, via an output interface; and when the variation of the VGM position request signal is not within the predetermined range, transmitting a processed signal, based on the VGM position request signal, to a controller of the VGM.

In some embodiments, the signal processing device is a first-order low-pass filter having a predetermined time constant selected for filtering noise above a predetermined frequency threshold.

In some embodiments, the signal processing device is a rate limiter.

In some embodiments, the rate limiter is configured to have a predetermined rate of change selected for filtering noise above a predetermined frequency threshold.

In some embodiments, the rate limiter is configured to have a predetermined dead band selected for filtering noise above a predetermined frequency threshold.

In some embodiments, the program instructions are further executable by the processing unit for at least one of reducing a noise level of the VGM position request signal and smoothing the VGM position request signal.

In some embodiments, when the VGM position request signal is not within the predetermined range, the program instructions are further executable by the processing unit for producing the processed signal by scaling the VGM position request signal by a factor associated with the predetermined range.

In some embodiments, scaling the VGM position request signal by a factor associated with the predetermined range comprises reducing each of a plurality of subsequent values of the VGM position request signal by half of the value of the predetermined range.

In some embodiments, the VGM position request signal is based on one of a power and a speed of the aircraft engine.

In some embodiments, the program instructions are further executable by the processing unit for receiving an activation signal from an engine controller associated with the aircraft engine, wherein the filtering occurs responsive to the activation signal.

In accordance with another broad aspect, there is provided a method for processing a control signal for a variable geometry mechanism (VGM) of an aircraft engine, the method comprising: obtaining a VGM position request signal indicative of a requested position change for the VGM; determining whether a variation of the VGM position request signal is within a predetermined range; when the variation of the VGM position request signal is within the predetermined range: filtering the VGM position request signal to reduce a level of noise in the VGM position request signal; and transmitting the filtered VGM position request signal to a controller of the VGM; and when the variation of the VGM position request signal is not within the predetermined range, transmitting a processed signal, based on the VGM position request signal, to a controller of the VGM.

In some embodiments, filtering the VGM position request signal comprises subjecting the VGM position request signal to a first-order low-pass filter having a predetermined time constant selected for filtering noise above a predetermined frequency threshold.

In some embodiments, filtering the VGM position request signal comprises subjecting the VGM position request signal to a rate limiter configured to have a predetermined rate of change selected for filtering noise above a predetermined frequency threshold.

In some embodiments, filtering the VGM position request signal comprises subjecting the VGM position request signal to a rate limiter configured to have a predetermined dead band selected for filtering noise above a predetermined frequency threshold.

In some embodiments, the method further comprises at least one of reducing a noise level of the VGM position request signal and smoothing the VGM position request signal.

In some embodiments, the method further comprises, when the VGM position request signal is not within the predetermined range, producing the processed signal by scaling the VGM position request signal by a factor associated with the predetermined range.

In some embodiments, the VGM position request signal is based on one of a power and a speed of the aircraft engine.

In some embodiments, the method further comprises receiving an activation signal from an engine controller associated with the aircraft engine, wherein the filtering occurs responsive to the activation signal.

In accordance with a still further broad aspect, there is provided a control system for a variable geometry mechanism (VGM) of an engine, comprising: a steady-state unit, configured for producing a first signal indicative of a requested setting for the VGM based on a steady-state operating condition for the engine; a bias unit, configured for producing a second signal indicative of a requested change for the setting of the VGM; and a signal processing device coupled to the steady-state control and the bias control and configured for combining the steady-state signal and the bias signal to produce a VGM position request signal indicative of a requested position change for the VGM, and for: obtaining a VGM position request signal indicative of a requested position change for the VGM; determining whether a variation of the VGM position request signal is within a predetermined range; when the variation of the VGM position request signal is within the predetermined range: filtering the VGM position request signal to reduce a level of noise in the VGM position request signal; and transmitting the filtered VGM position request signal to a controller of the VGM; and when the variation of the VGM position request signal is not within the predetermined range, transmitting a processed signal, based on the VGM position request signal, to a controller of the VGM.

In some embodiments, the processed signal is produced by scaling the VGM position request signal by a factor associated with the predetermined range.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
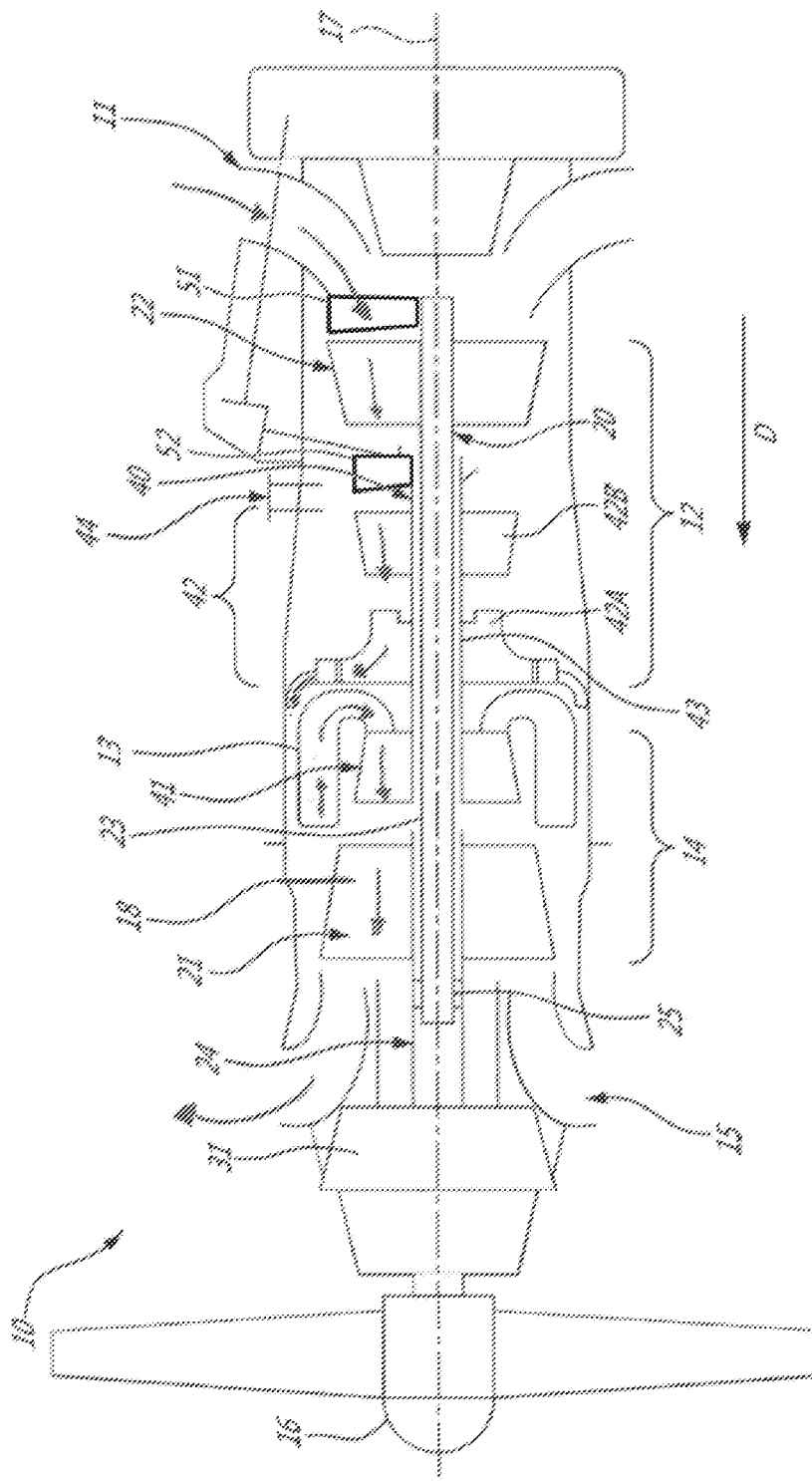
FIG. 1 is a schematic cross-sectional view of an example gas turbine engine.

FIG. 1 illustrates a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust outlet 15 through which the combustion gases exit the gas turbine engine 10. The engine 10 includes a propeller 16 which provides thrust for flight and taxiing. The gas turbine engine 10 has a longitudinal center axis 17.

The gas turbine engine 10 (sometimes referred to herein simply as "engine 10") has a central core 18 defining a gas path through which gases flow as depicted by flow arrows in FIG. 1. The illustrated engine 10 is a "reverse-flow" engine 10 because gases flow through the core 18 from the air inlet 11 at a rear portion thereof, to the exhaust outlet 15 at a front portion thereof. This is in contrast to "through-flow" gas turbine engines in which gases flow through the core of the engine from a front portion to a rear portion. The direction of the flow of gases through the core 18 of the engine 10 disclosed herein can be better appreciated by considering that the gases flow through the core 18 in the same direction D as the one along which the engine 10 travels during flight. Stated differently, gases flow through the engine 10 from a rear end thereof towards the propeller 16.

Although illustrated as a turboprop engine, the gas turbine engine 10 may alternatively be another type of engine, for example a turbofan engine, also generally comprising in serial flow communication a compressor section, a combustor, and a turbine section, and a fan through which ambient air is propelled. A turboshaft engine may also apply. Similarly, although illustrated as a reverse-flow engine, the techniques described herein can also be applied to through-flow engines. In addition, although the engine 10 is described herein for flight applications, it should be understood that other uses, such as industrial or the like, may apply.

Still referring to FIG. 1, the engine 10 has multiple spools which perform compression to pressurize the air received through the air inlet 11, and which extract energy from the combustion gases before they exit the core 18 via the exhaust outlet 15, According to the illustrated example, the engine 10 is provided in the form of a multi-spool engine having a low pressure (LP) spool 20 and a high pressure (HP) spool 40 independently rotatable about axis 17. However, it is understood that a multi-spool engine could have more than two spools. It should also be noted that the embodiments described herein also consider the use of single-spool engines.

The LP spool 20 includes at least one component to compress the air that is part of the compressor section 12, and at least one component to extract energy from the combustion gases that is part of the turbine section 14. More particularly, the LP spool 20 has a low pressure turbine 21 which extracts energy from the combustion gases, and which is drivingly engaged to an LP compressor 22 for pressurizing the air. The LP turbine 21 (also referred to as the power turbine) drives the LP compressor 22, thereby causing the LP compressor 22 to pressurize the air. Both the LP turbine 21 and the LP compressor 22 are disposed along the axis 17. In the depicted embodiment, both the LP turbine 21 and the LP compressor 22 are axial rotatable components having an axis of rotation that is coaxial with the center axis 17. They can include one or more stages, depending upon the desired engine thermodynamic cycle, for example.

In the depicted embodiment, the LP spool 20 has a power shaft 23 which mechanically couples the LP turbine 21 and the LP compressor 22, and extends axially between them. The shaft 23 is coaxial with the central axis 17 of the engine 10. The shaft 23 allows the LP turbine 21 to drive the LP compressor 22 during operation of the engine 10. The shaft 23 is not limited to the configuration depicted in FIG. 1, and can also mechanically couple the LP turbine 21 and the LP compressor 22 in any other suitable way provided that it transmits a rotational drive from the LP turbine 21 to the LP compressor 22. For example, the shaft 23 can be combined with a geared LP compressor 22 to allow the LP compressor 22 to run at a different rotational speed from the LP turbine 21. This can provide more flexibility in the selection of design points for the LP compressor.

Still referring to FIG. 1, the engine 10 includes an output drive shaft 24. The drive shaft 24 extends forwardly from the LP turbine 21 and is drivingly engaged thereto. In the illustrated example, the drive shaft 24 is distinct from the power shaft 23 and mechanically coupled thereto to be driven by the LP turbine 21. In the depicted embodiment, the drive shaft 24 and the power shaft 23 are coaxial and interconnected. FIG. 1 shows that the power and drive shafts 23, 24 are interconnected with a spline 25. The spline 25, which can include ridges or teeth on the drive shaft 24 that mesh with grooves in the power shaft 23 (or vice versa), allows for the transfer of torque between the drive shaft 24 and the power shaft 23. In the depicted embodiment, the power shaft 23 lies at least partially within the drive shaft 24, such that the spline 25 transfers the rotational drive or torque generated by the LP turbine 21 from the drive shaft 24 to the power shaft 23. The spline 25 can operate so that the power shaft 23 and the drive shaft 24 rotate at the same rotational speed. Other mechanical techniques can also be used to interconnect the power and drive shafts 23, 24. For example, the power and drive shafts 23, 24 can be interconnected by curvic coupling, pins, and interference fits. Other configurations of the drive shaft 24 and the power shaft 23 are also possible. For example, the drive shaft 24 and the power shaft 23 can be a single shaft driven by the LP turbine 21. The drive shaft 24 therefore transfers the rotational output of the LP turbine 21 in a forward direction to drive another component.

A rotatable load, which in the embodiment shown includes the propeller 16, is mountable to the engine 10, and when mounted, is drivingly engaged to the LP turbine 21, and is located forward of the LP turbine 21. In such a configuration, during operation of the engine 10, the LP turbine 21 drives the rotatable load such that a rotational drive produced by the LP turbine 21 is transferred to the rotatable load. The rotatable load can therefore be any suitable component, or any combination of suitable components, that is capable of receiving the rotational drive from the LP turbine 21, as now described.

In the embodiment shown, a reduction gearbox 31 (sometimes referred to herein simply as "RGB 31") is mechanically coupled to a front end of the drive shaft 24, which extends between the RGB 31 and the LP turbine 21. The RGB 31 processes and outputs the rotational drive transferred thereto from the LP turbine 21 via the drive shaft 24 through known gear reduction techniques. The RGB 31 allows for the propeller 16 to be driven at its optimal rotational speed, which is different from the rotational speed of the LP turbine 21.

Still referring to FIG. 1, the HP spool 40 with at least one component to compress the air that is part of the compressor section 12, and at least one component to extract energy from the combustion gases that is part of the turbine section 14. The HP spool 40 is also disposed along the axis 17 and includes an HP turbine 41 drivingly engaged (e.g. directly connected) to a high pressure compressor 42 by an HP shaft 43 rotating independently of the power shaft 23. Similarly to the LP turbine 21 and the LP compressor 22, the HP turbine 41 and the HP compressor 42 can include various stages of axial rotary components. In the depicted embodiment, the HP compressor 42 includes a centrifugal compressor 42A or impeller and an axial compressor 42B, both of which are driven by the HP turbine 41. During operation of the engine 10, the HP turbine 41 drives the HP compressor 42.

It can thus be appreciated that the presence of the above-described LP and HP spools 20, 40 provides the engine 10 with a "split compressor" arrangement. More particularly, some of the work required to compress the incoming air is transferred from the HP compressor 42 to the LP compressor 22. In other words, some of the compression work is transferred from the HP turbine 41 to the more efficient LP turbine 21. This transfer of work may contribute to higher pressure ratios while maintaining a relatively small number of rotors. In a particular embodiment, higher pressure ratios allow for higher power density, better engine specific fuel consumption (SFC), and a lower turbine inlet temperature (sometimes referred to as "T4") for a given power. These factors can contribute to a lower overall weight for the engine 10. The transfer of compression work from the HP compressor 42 to the LP compressor 22 contrasts with some conventional reverse-flow engines, in which the high pressure compressor (and thus the high pressure turbine) perform all of the compression work.

In light of the preceding, it can be appreciated that the LP turbine 21 is the "low-speed" and "low pressure" turbine when compared to the HP turbine 41. The LP turbine 21 is sometimes referred to as a "power turbine". The turbine rotors of the HP turbine 41 spin at a higher rotational speed than the turbine rotors of the LP turbine 21 given the closer proximity of the HP turbine 41 to the outlet of the combustor 13. Consequently, the compressor rotors of the HP compressor 42 may rotate at a higher rotational speed than the compressor rotors of the LP compressor 22. The engine 10 shown in FIG. 1 is thus a "two-spool" engine 10.

The HP turbine 41 and the HP compressor 42 can have any suitable mechanical arrangement to achieve the above-described split compressor functionality. For example, and as shown in FIG. 1, the HP spool 40 includes a high pressure shaft 43 extending between the HP compressor 42 and the HP turbine section 41. The high pressure shaft 43 is coaxial with the power shaft 23 and rotatable relative thereto. The relative rotation between the high pressure shaft 43 and the power shaft 23 allow the shafts 23, 43 to rotate at different rotational speeds, thereby allowing the HP compressor 42 and the LP compressor 22 to rotate at different rotational speeds. The HP shaft 43 can be mechanically supported by the power shaft 23 using bearings or the like. In the depicted embodiment, the power shaft 23 is at least partially disposed within the HP shaft 43.

The split compressor arrangement also allows bleed air to be drawn from between the HP compressor 42 and the LP compressor 22. More particularly, in the embodiment of FIG. 1, the engine 10 includes an inter-stage bleed 44 port or valve that is aft of the HP compressor 42 and forward of the LP compressor 22, which may provide for increased flexibility in the available bleed pressures. In a particular embodiment, the bleed pressure design point of the inter-stage bleed 44 is selected based on the pressure ratio of the LP compressor 22, which runs independently from the HP compressor 42. For operability, variable inlet guide vanes (VIGV) 51 and variable guide vanes (VGV) 52 can be used on the LP compressor 22 and at the entry of the HP compressor 42, together with the inter-stage bleed 44.

It should be noted that the engine of FIG. 1 represents only one example engine, and that the embodiments described herein can be applied to any other suitable manner of engine.

In some embodiments, the engine 10 includes one or more variable geometry mechanisms (VGMs) which may assist in achieving optimized engine transient response. In some embodiments, the VGMs consists of one or more VGVs, for instance the VIGV 51 and the VGV 52, which may be one of inlet compressor guide vanes for directing air into the compressor section 12, outlet guide vanes for directing air out of the compressor section 12, variable stator vanes for directing incoming air into rotor blades of the engine 10, and/or one or more variable nozzles, variable bleed-off valves, for instance the inter-stage bleed 44, and the like. It should be understood that one or more of the above-mentioned VGMs may be adjusted for the purpose of decreasing the response time of the engine 10 during rapid engine transitions, e.g. from low to high power levels, or vice-versa. Indeed, adjustment of the position (e.g. the angle) of the VGMs can impact the inlet mass flow to the engine 10, and in turn allow the engine 10 to operate at a required power.

In some embodiments, as illustrated in FIG. 1, the engine 10 has a dual compression system with a low-spool compression system (LPC), including the LP spool 20, and a high-spool compression system (HPC), including the HP spool 40, which are separate from one-another. The VGMs include the VIGV 51 at the air inlet 11 near the LPC and the VGVs 52 upstream of the HPC. It should be noted that other VGMs may also be included for both the LPC and the HPC. In other embodiments, the engine 10 includes only one compression system, and includes fewer or more VGMs.

Figure 2:
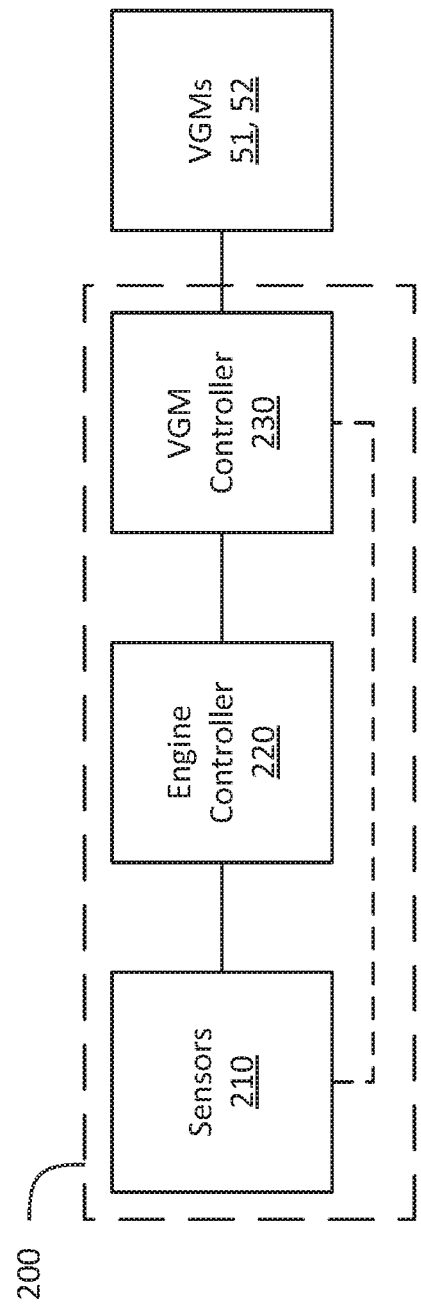
FIG. 2 is a block diagram of an example control system for the engine of FIG. 1.

With reference to FIG. 2, an embodiment of an engine control system 200 for the engine 10 is illustrated. The engine control system 200 includes one or more sensors 210, an engine controller 220, and a VGM controller 230. The sensors 210 are coupled to the engine controller 220, which in turn is coupled to the VGM controller 230. In some embodiments, some of the sensors 210 are also coupled to the VGM controller 230. The engine controller 220, and optionally the VGM controller 230, are configured for obtaining various inputs from the sensors 210.

The engine controller 220 can be communicatively coupled to any number of systems for effecting control of the engine 10. For instance, the engine controller can be coupled to fuel flow valves, gear actuators, and the like. The VGM controller 230 is communicatively coupled to the VGMs 51, 52, and any other VGMs of the engine 10, for issuing commands thereto, for instance to control positions of the VGMs 51, 52. Although the engine control system 200 in FIG. 2 is illustrated as including only the sensors 210, the engine controller 220, and the VGM controller 230, it should be noted that practical applications of the engine control system 200 may include any number of other suitable components and controllers.

The sensors 210 are configured for acquiring various data about the engine 10 and the aircraft in which the engine 10 operates. The sensors 210 can be disposed throughout the engine 10 and/or the aircraft, and can be configured for measuring any suitable information about the operation of the engine 10 and/or the aircraft. The sensors 210 can include pressure sensors, temperature sensors, rotation sensors, speed sensors, accelerometers, gyrosensors, and the like. In some embodiments, the sensors 210 include one or more virtual sensors, which use other measurements to derive a desired value, for example in software.

The engine controller 220 is configured for controlling operation of the engine 10. This can include modulating a fuel flow to the engine, adjusting various operational parameters of the engine, for instance a gearing of the RGB 31, and the like. In some embodiments, the engine controller 220 is configured for altering the operation of one or more VGMs, for example the VIGV 51 and the VGV 52, via the VGM controller 230. For example, the engine controller 220 can send instructions to the VGM controller 230 indicative of desired changes in engine operating conditions: for instance, the engine controller 220 can request changes relating to temperature, pressure, and the like. The VGM controller 230 is configured for interpreting the instructions from the engine controller 220 and causing suitable changes to the position and/or orientation of the VGMs 51, 52 to enact the requested changes to the engine operating conditions. In other embodiments, the VGM controller 230 obtains various inputs from the sensors 210 indicating changes in the operating conditions of the engine 10, and determines based thereon corresponding changes to the operating conditions of the VGMs 51, 52, to be implemented.

The VGM controller 230 is configured for issuing commands to the VGMs 51, 52 in order to effect changes in the position, orientation, and the like, of the VGMs 51, 52. In some embodiments, the VGM controller 230 issues the commands to motors, actuators, or similar active elements of the VGMs 51, 52, to cause movement in the VGMs 51, 52, in line with the instructions received by the VGM controller 230 from the engine controller 220. For example, a position of the VIGV 51 and/or the VGV 52, an orientation of the VIGV 51 and/or the VGV 52, a degree of openness of an aperture formed by the VIGV 51 and/or the VGV 52, and/or any other suitable aspects of the VIGV 51 and/or the VGV 52 can be adjusted. In another example, the position and/or a degree of openness of a variable bleed-off valve can be adjusted. Still other embodiments, involving one of inlet compressor guide vanes for directing air into the compressor section 12, outlet guide vanes for directing air out of the compressor section 12, variable stator vanes for directing incoming air into rotor blades of the engine 10, and/or one or more variable nozzles, variable bleed-off valves, for instance the inter-stage bleed 44, and the like, are also considered.

Figure 3:
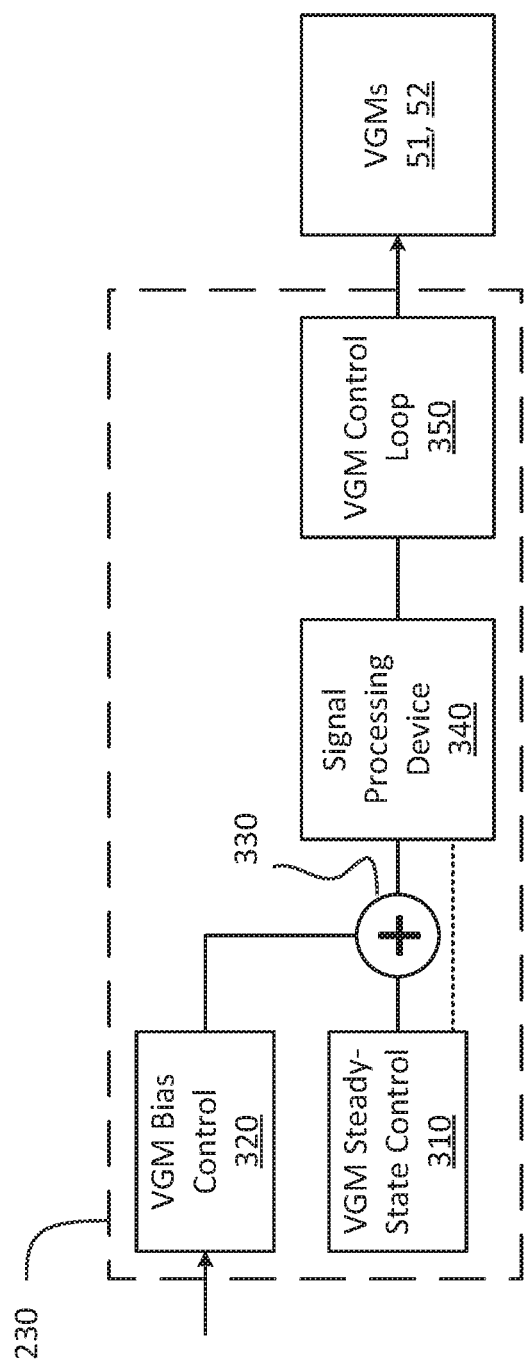
FIG. 3 is a block diagram of an embodiment of a variable geometry mechanism controller.

With reference to FIG. 3, an embodiment of the VGM controller 230 is illustrated. The VGM controller 230 is composed of a VGM steady-state (VGMSS) unit 310, a VGM bias (VGMB) unit 320, a signal adder 330, a signal processing device 340, and a VGM control loop (VGMCL) 350. The VGM controller 230 is configured for transmitting, via the VGMCL 350, signals to the actuators in the VGMs 51, 52, to effect a change in their position and/or orientation. In some embodiments, different VGM controllers 230 can be provided for each of the VGMs in the engine 10 in other embodiments, a single VGM controller 230 can control operation of multiple VGMs, for instance the VGMs 51, 52. Although the foregoing discussion focuses only on a single VGM 51, is should be understood that the same notions could be applied to a multi-VGM system.

The VGMSS unit 310 and the VGMB unit 320 are configured for providing different portions of a control signal, which are combined via the signal adder 330. The VGMSS unit 310 is configured for producing a first signal which is indicative of a requested setting for the VGM 51 based on a current steady-state operation condition for the engine 10, and the VGMB unit 320 is configured for producing a second signal which is indicative of a requested change for the setting of the VGM 51. In some embodiments, the second signal is produced in response to a transition between operating conditions for the engine 10, for example acceleration, deceleration, changes in altitude, and the like.

The first and second signals are then combined by the adder 330 to form a VGM position request signal. The VGM position request signal is then transmitted, via the signal processing device 340, to the VGM control loop 350, for controlling the VGM 51. For example, the signal sent to the VGM 51 by the VGM controller 230 can be a voltage-encoded signal, in which the desired setting for the VGM 51 is set based on the voltage level of the signal. In one particular control scheme, a higher voltage level can indicate that the requested setting for the VGM 51 is more open, and a lower voltage level can indicate that the requested setting for the VGM 51 is more closed. Other approaches are also considered.

The VGMSS unit 310 produces the first signal having a voltage which substantially corresponds to the current setting for the VGM. By adding the second signal produced by the VGMB unit 320, via the adder 330, to the first signal produced by the VGMSS unit 310, the resultant combined signal (i.e. the VGM position request signal) indicates a new desired setting for the VGM 51. For instance, if the second signal produced by the VGMB unit 320 is negative, the resulting VGM position request signal will be lower than a previous value of the VGM position request signal, indicating that the engine controller 320 provided instructions which should result in a closing of the VGM 51. Conversely, if the second signal produced by the VGMB unit 320 is positive, the resulting VGM position request signal will be higher than a previous value of the VGM position request signal, indicating that the engine controller 320 provided instructions which should result in an opening of the VGM. Of course, other control schemes, for instance using signals on carrier waves, using digital signals, or other approaches, are also considered.

In some embodiments, the VGMB unit 320 receives, as part of the instructions provided by the engine controller 220, a speed signal, which can be used as a basis for the first signal produced by the VGMSS unit 310, and the second signal produced by the VGMB unit 320. In some embodiments, the VGMSS unit 310 and/or the VGMB unit 320 is provided with one or more lookup tables, maps, algorithms, and/or other types of mathematical relationships which allow the VGMSS unit 310 and/or the VGMB unit 320 to produce the first and/or the second signal based on the speed signal received from the engine controller 220. Although the present discussion focuses primarily on the use of a speed signal, it should be noted that other signals, for instance a power signal, a torque signal, a pressure signal and/or any other suitable signal, are also considered.

However, the speed signal (or power, torque, etc. signal) received from the engine controller 220, or from the sensors 210, can, in certain instances, exhibit noise of various types, including white, Brownian, etc., jitter, and the like. In addition, small but expected variations in the speed signal are possible, despite not being indicative of actual changes in the requested speed for the engine 10. This can lead to the VGMSS unit 310 and/or the VGMB unit 320 continually producing slightly varying signals, despite the engine 10 operating substantially at steady-state, and no actual change in the VGM 51 position having been requested. Put differently, the VGMSS unit 310 and/or the VGMB unit 320 can interpret the noise in the speed signal received from the engine controller 320 as instructions to effect changes in the position of the VGM 51, and therefore produce varying first or second signals indicative of these perceived changes. Due to the random nature of signal noise, this can result in increased wear on the actuators which move the VGM 51, and the VGM 51 itself, due to repeated and continuous changes in position.

To address this issue, the combined signal provided by the adder 330 is then sent to the signal processing device 340. It should be noted that in some embodiments, the adder 330 and the signal processing device 340 can be embodied as a single device. The signal processing device 340 is configured for processing the combined signal to mitigate the risk of continually adjusting the position, orientation, and the like, of the VGM 51, by removing, reducing, or mitigating the noise, dithering, and minor variations present in the combined signal, thereby producing a filtered signal. The signal processing device 340 then transmits the filtered signal to the VGM control loop 350, which is configured for operating the actuators of the VGM 51, as discussed hereinabove. In some embodiments, the signal processing device 340 is configured for filtering the combined signal to remove portions of the signal which are considered noise.

The signal processing device 340 evaluates the combined signal against a signal range for the combined signal: when variations over time in the combined signal are within the signal range, the variations are attributed to noise, and the signal processing device 340 performs one or more signal processing techniques to reject the variations. This is so that the movements effects produced by the VGMCL 350 based on the processed signal are smoother and more gradual, which can assist in reducing wear on the VGMs 51, 52. The signal range can be any suitable range, and can be centered at a current setting for the VGM 51, for instance based on the first signal produced by the VGMSS unit 310, For example, if the VGMSS unit 310 and the VGMB unit 320 use a speed signal (expressed as revolutions-per-minute, or RPM) as a basis for controlling operation of the VGM 51, the signal range can be 50 RPM centered at the current speed of the engine 10, based on the first signal. If the current speed of the engine is 500 RPM, any change in the speed of the engine between 475 and 525 RPM would fall within the signal range of 50 RPM, and would be rejected or processed by the signal processing device 340. Other examples, signal ranges, and the like, are also considered.

When changes in the combined signal from one sampling time to a subsequent sampling time fall within the signal range, the changes can be considered noise and/or minor variations. In response, the signal processing device 340 performs processing of the combined signal to remove the noise of the combined signal. In some embodiments, the noise in the combined signal consists of high-frequency signal components: for instance, any signal portion having a frequency above 3, 5, or 10 Hz, or any other suitable value, can be considered noise.

The signal processing device 340 can be configured for processing the combined signal provided by the adder 330 in any suitable fashion in order to mitigate the noise present in the combined signal due to the speed signal obtained at the VGMSS unit 310 and/or the VGMB unit 320, from the engine controller 220 and/or the sensors 210. In some embodiments, the signal processing device 340 includes, or is substantially composed of, an electronic filter, which may be implemented using hardware or software. For example, the filter can be embodied as a resistor-capacitor (RC) filter, a resistor-inductor (RL) filter, a resistor-inductor-capacitor (RLC) filter, a T filter, a π filter, and the like. In another example, the signal processing device 340 is configured for obtaining a digital representation of the combined signal, for instance via an analog-to-digital converter (ADC), for filtering the digital representation in software, and for producing the filtered signal as an analog signal, for instance via a digital-to-analog converter (DAC). Still other filtering approaches are considered.

Whether implemented in hardware or software, the filter may be any suitable type of filter, such as a first-order low-pass filter. For example, the first-order low-pass filter can be designed to have a time constant selected for filtering the combined signal to remove noise, for example based on the frequency threshold associated with noise, as discussed hereinabove. In some embodiments, the signal processing device 340 can additionally perform signal smoothing, noise reduction, signal modulation and/or demodulation, and the like. Alternatively, separate signal smoothing, noise reducing, or other devices can be incorporated into the VGM controller 230 and placed between the adder 330 and the signal processing device 340 to perform one or more signal pre-treatment operations, prior to the signal processing device 340 receiving the combined signal.

In other embodiments, the signal processing device 340 includes, or is substantially composed of, a rate limiter circuit, or a device which implements rate-limiting functionality in software. The rate limiter circuit can be designed to have a characteristic rate-of-change and/or a dead-band selected for filtering the combined signal to remove noise. A software-based rate-limiter can have a similarly-selected characteristic rate-of-change and/or dead-band.

When the signal processing device 340 evaluates the combined signal against the signal range and determines that variations in the combined signal are not due to noise and/or minor variations in the signals from the sensors 210 and/or the engine controller 220, the signal processing device is configured for producing the processed signal and for providing the processed signal to the VGMCL 350, which is configured for interpreting the processed signal and for commanding operation of the VGM 51, for instance via actuators thereof. The VGMCL 350 can be a substantially analog device, which performs analog-domain signal processing to transform the processed signal into commands for the VGM 51. Alternatively, the VGMCL 350 can be implemented in software, for example as part of a full-authority digital engine controls (FADEC), and can produce via software the necessary commands for the VGM 51.

In some embodiments, the processed signal produced by the signal processing device 340 is a scaled version of the combined signal. The combined signal can be reduced, for example based on the signal range, such that the movements effects by the VGMCL 350 based on the processed signal are smoother when transitioning beyond a suitable range and more rapid albeit less accurate, which can assist in rapid tracking on the VGMs 51, 52. In an example in which the combined signal is a speed-based signal measured in RPM, the range can be expressed as 50 RPM. In the case of a transition from 500 RPM to 800 RPM, the processed signal can track the transition over subsequent sampling times by reducing the value of each subsequent RPM value by half the value of the signal range. For instance, if the combined signal is sampled at 600 RPM, this can be reduced by 25 (half the signal range of 50 RPM) to 575 RPM. In this fashion, the actual transition in the VGMs 51, 52 commanded by the VGMCL 350 is offset, when compared to the combined signal, and the movement commanded in the VGMs 51, 52 is more rapid beyond the suitable range, thereby produced in the VGMs 51, 52 is smoother when transitioning back within the suitable range.

It should be noted that other approaches for producing the processed signal as a scaled version of the combined signal are considered. For example, the processed signal can be a time-delayed version of the combined signal. In another example, the processed signal can be a time-dilated version of the combined signal. In a further example, the processing device 340 can perform one or more signal processing techniques when producing the processed signal, for instance interpolation or similar techniques.

In some embodiments, the signal processing device 340 is configured for being activated or deactivated based on one or more events. For example, the signal processing device 340 can be active during certain portions of a flight mission of the aircraft. In another example, the signal processing device 340 can be activated in response to an activation signal, for instance as commanded by the engine controller 220, and can be deactivated in similar fashion. Still other events are considered.

As such, the VGM controller 230 is configured for controlling operation of the VGMs 51, 52, while substantially ignoring unrequested changes to the position and/or orientation of the VGMs 51, 52, induced by noisy power, torque, or other signals used during the production of the control signals for the VGMs 51, 52. It should be noted that the terms "position" and "orientation", as used herein, can be used interchangeably, and the use of one does not exclude the use of the other.

Figure 4:
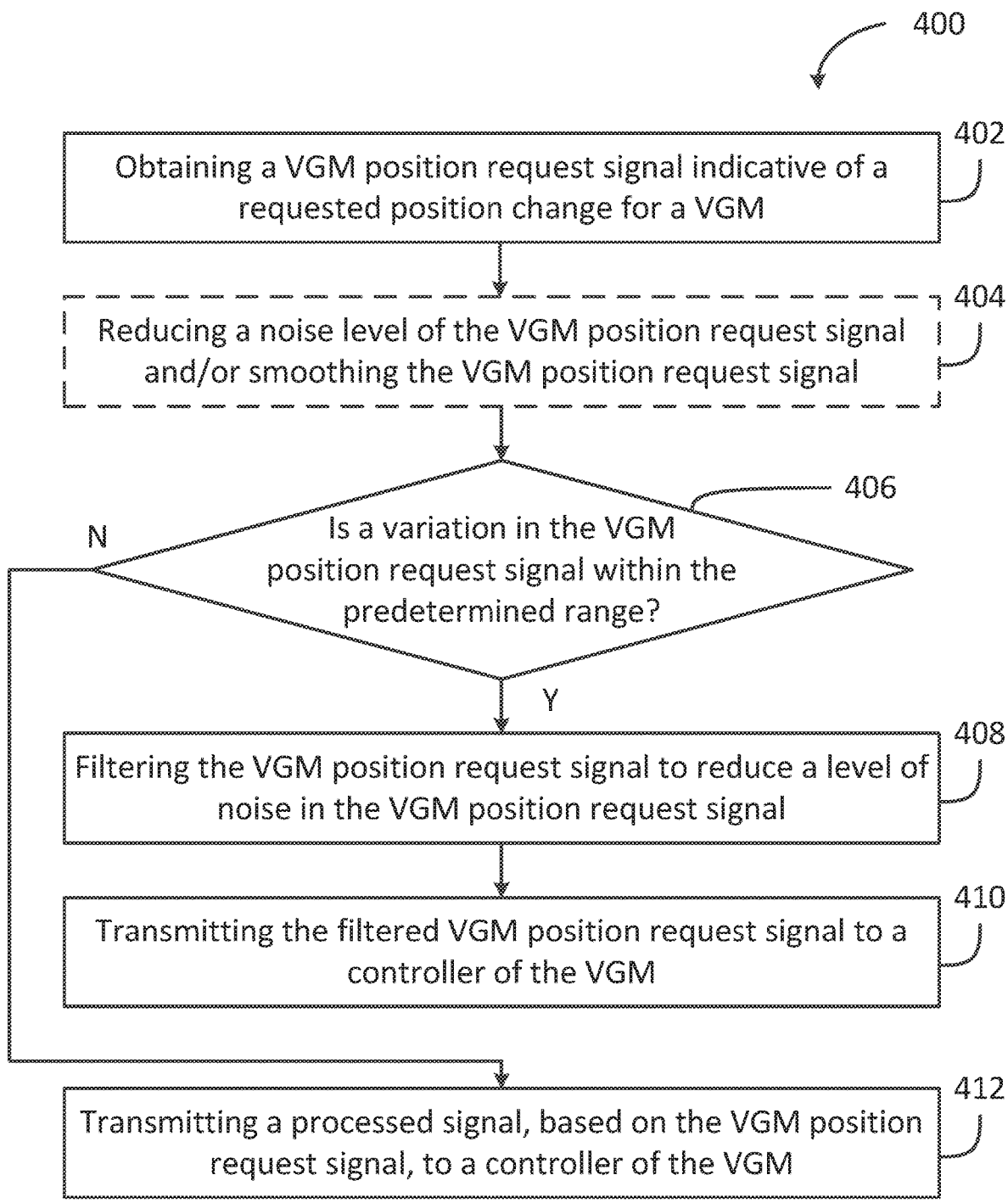
FIG. 4 is a flowchart illustrating an example method for controlling operation of a variable geometry mechanism, in accordance with an embodiment.

With reference to FIG. 4, there is provided a method 400 for controlling operation of the VGMs 51, 52. At step 402, a VGM position request signal is obtained The VGM position request signal is indicative of a requested position change for a VGM, for instance one of the VGMs 51, 52. The VGM position request signal can be obtained, for instance, from the adder 330, which combines the first and second signals to produce the VGM position request signal based on instructions obtained from the engine controller 220.

Optionally, at step 404, a noise level of the VGM position request signal is reduced and/or the VGM position request signal is smoothed, for instance via the signal processing device 340. The noise level reduction and/or smoothing can be implemented using any suitable techniques.

At decision step 406, a determination is made regarding whether a variation of the VGM position signal is within a predetermined range. The predetermined range can be, as described hereinabove, a range centered at a current value for the VGM position signal. When the variation of the VGM position signal is within the predetermined range, the method can move to step 408. When the variation of the VGM position signal is not within the predetermined range, the method can move to step 412, At step 408, the VGM position request signal is filtered to reduce a level of noise in the VGM position request signal, thereby producing a filtered signal. For example, the filtering can be performed by the signal processing device 340, and can comprise removing, reducing, or mitigating the noise and/or minor variations to produce the filtered signal.

At step 410, the filtered VGM position request signal is transmitted to a controller of the VGM, for example the VGMCL 350. The filtered VGM position request signal can be transmitted using any suitable protocol, and in any suitable format.

When the determination performed at step 406 indicates that the variation of the VGM position request signal is outside the predetermined range, the method 400 moves to step 412. At step 412, a processed signal, based on the VGM position request signal, is transmitted to a controller of the VGM, for example the VGMCL 350. The processed signal can be the VGM position request signal itself, a noise-reduced and/or smoothed version of the VGM position request signal, or a delayed, time-dilated, interpolated, or other signal which has been processed to produce a smoother and/or more gradual movement in the VGMs 51, 52. In some embodiments, transmitting the processed signal comprises processing the signal, for example to scale the signal based on the signal range, or based on any other suitable factor.

Figure 5:
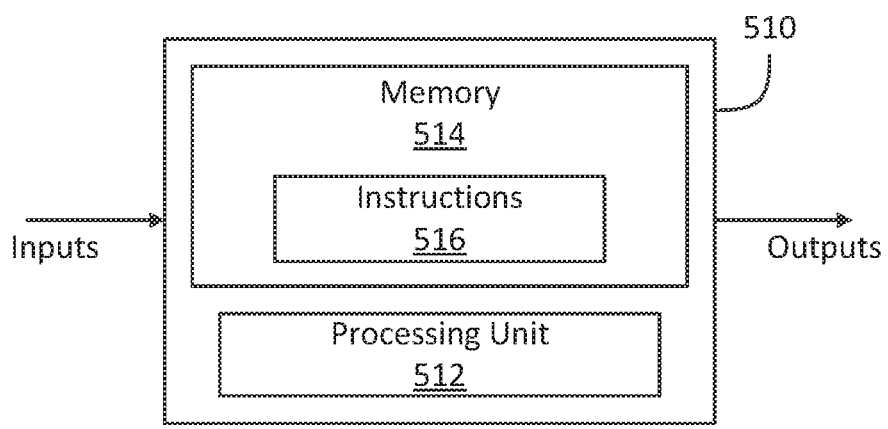
FIG. 5 is a block diagram of an example computer system for implementing the method of FIG. 4.

With reference to FIG. 5, the method 400 may be implemented by a computing device 510, comprising a processing unit 512 and a memory 514 which has stored therein computer-executable instructions 516. The processing unit 512 may comprise any suitable devices configured to implement the method 400 such that instructions 516, when executed by the computing device 510 or other programmable apparatus, may cause the functions/acts/steps performed as part of the method 400 as described herein to be executed. The processing unit 512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 514 may comprise any suitable known or other machine-readable storage medium. The memory 514 may comprise non-transitory computer readable storage medium, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 514 may comprise any storage means (e.g., devices) suitable for retrievably storing machine-readable instructions 516 executable by processing unit 512.

It should be noted that the engine controller 220, the VGM controller 230, and any other suitable elements of the engine control system 200, may be implemented as part of a full-authority digital engine controls (FADEC) or other similar device, including electronic engine control (EEC), engine control unit (EUC), various actuators, and the like.

The methods and systems for controlling operation of a VGM of an aircraft engine described herein may be implemented in a high level procedural or object oriented programming or scripting language, or a combination thereof, to communicate with or assist in the operation of a computer system, for example the computing device 510. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 512 of the computing device 510, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A control system for use in an aircraft engine with a variable geometry mechanism (VGM), the control system comprising:
   at least one processing unit; and
   a non-transitory computer-readable memory communicatively couple to the at least one processing unit and having stored thereon computer-readable program instructions executable by the at least one processing unit for:
      obtaining a VGM position request signal via an input interface, the VGM position request signal indicative of a requested position change for the VGM;
      determining whether a variation of the VGM position request signal relative to a previous VGM position request signal is within a predetermined range;
      when the variation of the VGM position request signal is within the predeterminded range:
         filtering the VGM position request signal to reduce a level of noise in the VGM position request signal to obtain a filtered VGM position request signal; and
         controlling operation of at least one actuator in the VGM to adjust a position of the VGM on the basis of the filtered VGM position request signal; and
      when the variation of the VGM position request signal is not within the predetermined range;
         scaling the VGM position request signal to obtain a scaled signal; and
         controlling the operation of the at least one actuator of the VGM to adjust the position of the VGM on the basis of the processed scaled signal.

2. The control system of claim 1, wherein the filtering of the VGM position request signal comprises subjecting the VGM position request signal to a first-order low-pass filter having a predetermined time constant selected for filtering noise above a predetermined frequency threshold.

3. The control system of claim 1, wherein the filtering of the VGM position request signal comprises subjecting the VGM position request signal to a rate limiter.

4. The control system of claim 3, wherein the rate limiter is configured to have a predetermined rate of change selected for filtering noise above a predetermined frequency threshold.

5. The control system of claim 3, wherein the rate limiter is configured to have a predetermined dead band selected for filtering noise above a predetermined frequency threshold.

6. The control system of claim 1, wherein the program instructions are further executable by the at least one processing unit for smoothing the VGM position request signal.

7. The control system of claim 1, wherein the scaling of the VGM position request signal comprises reducing each of a plurality of subsequent values of the VGM position request signal by half of a value of the predetermined range.

8. The control system of claim 1, wherein the VGM position request signal is based on a power and/or a speed of the aircraft engine.

9. The control system of claim 1, wherein the program instructions are further executable by the at least one processing unit for receiving an activation signal, wherein the filtering occurs responsive to the activation signal.

10. A method for controlling a variable geometry mechanism (VGM) of an aircraft engine, the method comprising:
obtaining a VGM position request signal indicative of a requested position change for the VGM;
determining whether a variation of the VGM position request signal relative to a previous VGM position request signal is within a predetermined range;
when the variation of the VGM position request signal is within the predetermined range:
filtering the VGM position request signal to reduce a level of noise in the VGM position request signal to obtain a filtered VGM position request signal; and
controlling operation of at least one actuator of the VGM to adjust a position of the VGM on the basis of the filtered VGM position request signal; and
when the variation of the VGM position request signal is not within the predetermined range:
scaling the VGM position request signal to obtain a scaled signal; and
controlling the operation of the at least one actuator of the VGM to adjust the position of the VGM on the basis of the processed scaled signal.

11. The method of claim 10, wherein the filtering of the VGM position request signal comprises subjecting the VGM position request signal to a first-order low-pass filter having a predetermined time constant selected for filtering noise above a predetermined frequency threshold.

12. The method of claim 10, wherein the filtering of the VGM position request signal comprises subjecting the VGM position request signal to a rate limiter configured to have a predetermined rate of change selected for filtering noise above a predetermined frequency threshold.

13. The method of claim 10, wherein the filtering of the VGM position request signal comprises subjecting the VGM position request signal to a rate limiter configured to have a predetermined dead band selected for filtering noise above a predetermined frequency threshold.

14. The method of claim 10, further comprising smoothing the VGM position request signal.

15. The method of claim 10, wherein the VGM position request signal is based on a power and/or a speed of the aircraft engine.

16. The method of claim 10, further comprising receiving an activation signal, wherein the filtering occurs responsive to the activation signal.

17. A control system for a variable geometry mechanism (VGM) of an engine, comprising:
a steady-state unit, configured for producing a first signal indicative of a requested setting for the VGM based on a steady-state operating condition for the engine;
a bias unit, configured for producing a second signal indicative of a requested change for the setting of the VGM;
a VGM control loop for operating at least one actuator of the VGM to adjust a position of the VGM; and
a signal processing device coupled to the steady-state unit and the bias unit and to the VGM control loop and configured for combining the first signal and the second signal to produce a VGM position request signal indicative of a requested position change for the VGM, and for:
determining whether a variation of the VGM position request signal relative to a previous VGM position request signal is within a predetermined range;
when the variation of the VGM position request signal is within the predetermined range:
filtering the VGM position request signal to reduce a level of noise in the VGM position request signal to obtain a filtered VGM position request signal;
causing the VGM control loop to operate the at least one actuator of the VGM to adjust a position of the VGM on the basis of the filtered VGM position request signal; and
when the variation of the VGM position request signal is not within the predetermined range:
scaling the VGM position request signal to obtain a scaled signal; and
causing the VGM control loop to operate the at least one actuator of the VGM to adjust the position of the VGM on the basis of the scaled signal.

* * * * *